United States Patent [19]

Pini

[11] Patent Number: 4,643,628
[45] Date of Patent: Feb. 17, 1987

[54] APPARATUS FOR LOADING AND UNLOADING PALLETIZED ARTICLES

[76] Inventor: Maria Pini, Via Giordani Bruni, 16, 20154 - Milano, Italy

[21] Appl. No.: 603,827

[22] Filed: Apr. 25, 1984

[30] Foreign Application Priority Data

Jul. 30, 1983 [IT] Italy .............................. 22157 A/83

[51] Int. Cl.⁴ .............................................. B60P 1/48
[52] U.S. Cl. .................... 414/279; 414/283; 187/9 R
[58] Field of Search ............... 414/279, 282, 283, 652, 414/642, 592, 630, 281, 629; 187/9 E, 9 R, 1 R

[56] References Cited

U.S. PATENT DOCUMENTS

| | | | |
|---|---|---|---|
| 2,833,435 | 5/1958 | Levy | 414/282 |
| 3,726,427 | 4/1973 | Carlund | 414/642 |
| 4,065,012 | 12/1977 | Rocco | 414/642 |
| 4,505,630 | 3/1985 | Kuschner et al. | 414/279 |

FOREIGN PATENT DOCUMENTS

| | | | |
|---|---|---|---|
| 2254421 | 7/1972 | Fed. Rep. of Germany | 414/282 |
| 51605 | 3/1982 | Japan | 414/282 |

Primary Examiner—Joseph J. Rolla
Assistant Examiner—Kenneth Noland
Attorney, Agent, or Firm—Bucknam and Archer

[57] ABSTRACT

The apparatus comprises a base frame or chassis (1) mounted on wheels (20) effective to slide on guides (7), the base frame (1) supporting a floor (2) rotatable about a substantially vertical axis thereon a fork (12) bearing carriage (4) is effective to independently move, the forks (12) being provided, at the bottom thereof, with variable position supporting sliding wheels (13) for allowing for the raising and lowering of the fork engaged pallets.

2 Claims, 3 Drawing Figures

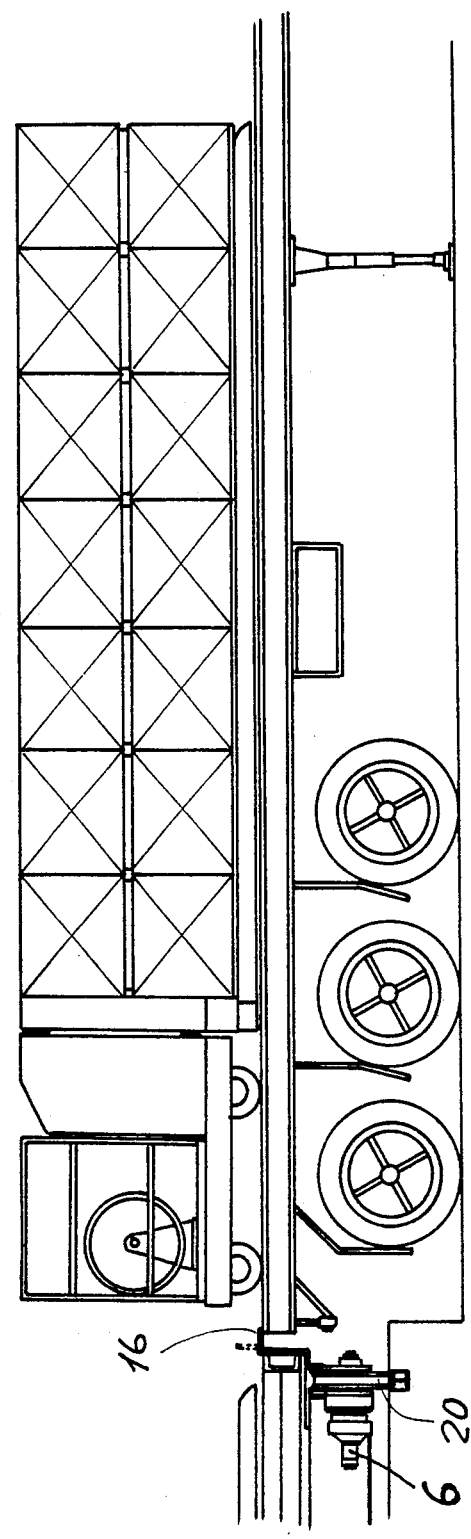

APPARATUS FOR LOADING AND UNLOADING PALLETIZED ARTICLES

The present invention relates to an apparatus for loading and unloading palletized articles.

As it is well known, a problem which is presently very felt in the handling of articles or goods in general, as arranged on conventional pallets is that of rationalizing in a maximum degree all of the transfer steps from the storing region or place to the transporting vehicles and containers and/or vice versa.

With the conventional handling methods the goods, as arranged on pallets, are handled by means of conventional fork truck which engage the pallets to transfer them to the intended place.

With the adopted approaches the handling operations are rather long and fatiguing, since it is necessary to properly arrange the loaded pallets is such a way as to optimally exploit the loading capacity of the transporting vehicle.

Another drawback of the known solutions is that it is generally impossible to simultaneously take up a great number of pallets.

Thus the pallet handling time, thereon goods are arranged, are rather long.

Accordingly, the task of the present invention is to obviate the thereinabove mentioned drawbacks by providing such an apparatus, for loading and unloading palletized articles which is effective to afford the possibility of optimizing all of the article handling steps, thereby affording the possibility of simultaneously transporting or taking up a very great number of pallets.

Within that task, it is a primary object of the present invention to provide such an apparatus which affords the possibility of perfectly arranging, by simple and quick operations, the loaded pallets, thereby exploiting optimally the available spaces and reducing in a maximum degree the handling time.

Another object of the present invention is to provide such a pallet handling apparatus which affords the possibility of directly loading the pallets at any places of the loading surface of a transportation vehicle or a store, which a very broad range of operation.

Another object of the present invention is to provide such a pallet handling apparatus therein it will be possible to fit, in a very quick way, the working level of said apparatus to the working level of the transportation vehicle operative surface, thereby greatly simplifying all of the loaded pallets transfer steps.

Another object of the present invention is to provide such a pallet handling apparatus which, due to its constructional features, is able of offering a great use reliability and safety.

Yet another object of the present invention is to provide such a pallet handling apparatus, for loading and unloading palletized articles or goods, which may be easily constructed by using easily commercially available components and materials and which, moreover, is of very reduced cost.

According to one aspect of the present invention, the thereinabove mentioned task and objects, as well as yet other objects which will become more apparent thereinafter, are achieved by a pallet loading and unloading apparatus characterized in that it comprises a base frame, mounted on wheels effective to slide on guides, said base frame supporting a floor rotatable about a substantially vertical axis thereon a fork bearing carriage is effective to independently move, said forks being provided, at the bottom thereof, with variable position supporting sliding wheel.

Further characteristics and advantages of the pallet handling apparatus according to the present invention will become more apparent from the following detailed description of a preferred embodiment whereof, being illustrated, by way of an indicative but not limitative example, in the figures of the accompanying drawings, where:

FIG. 3 illustrates the article loading operation said articles being directly palletized on the loading floor of a transportation vehicle.

Figure 1:
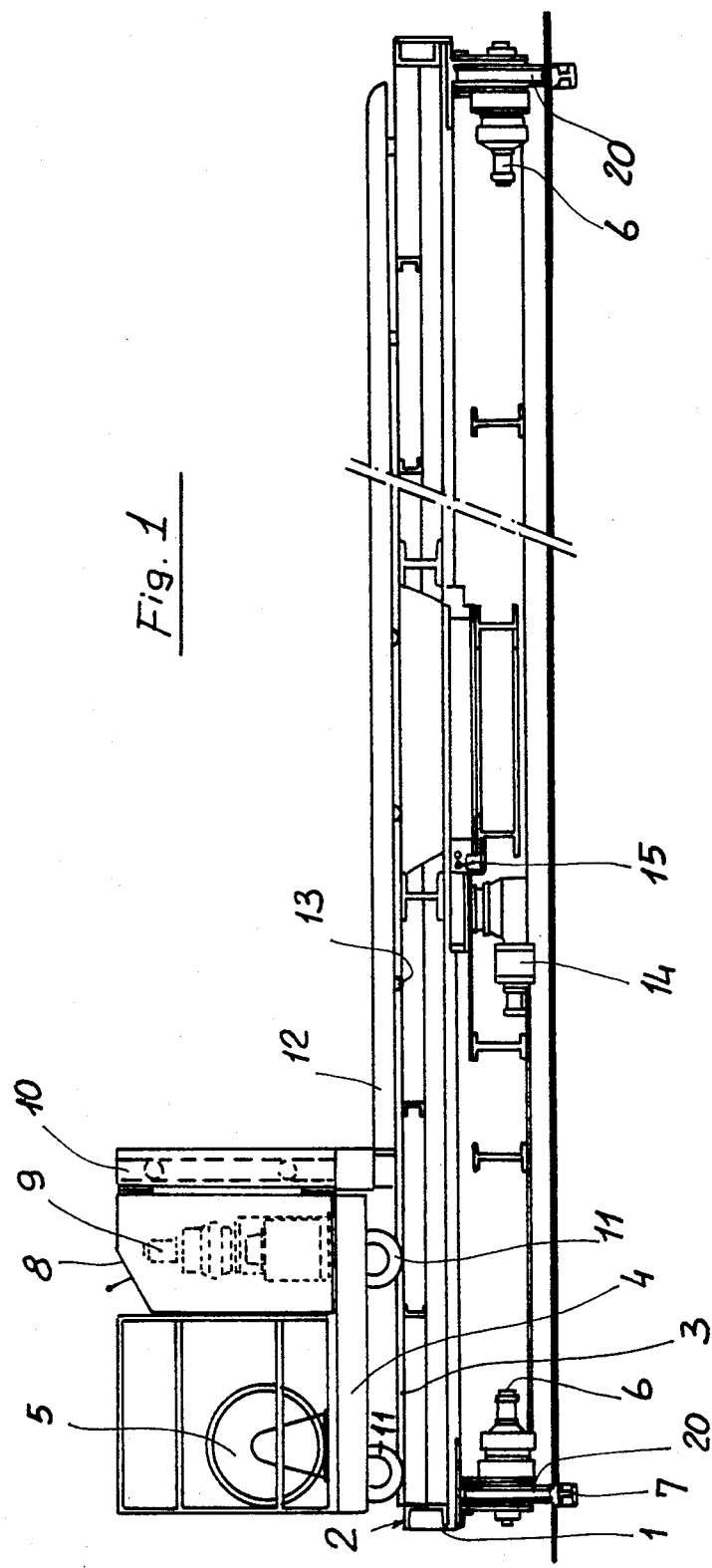
FIG. 1 is a schematic side elevation view illustrating the pallet handling apparatus according to the present invention.
Figure 2:
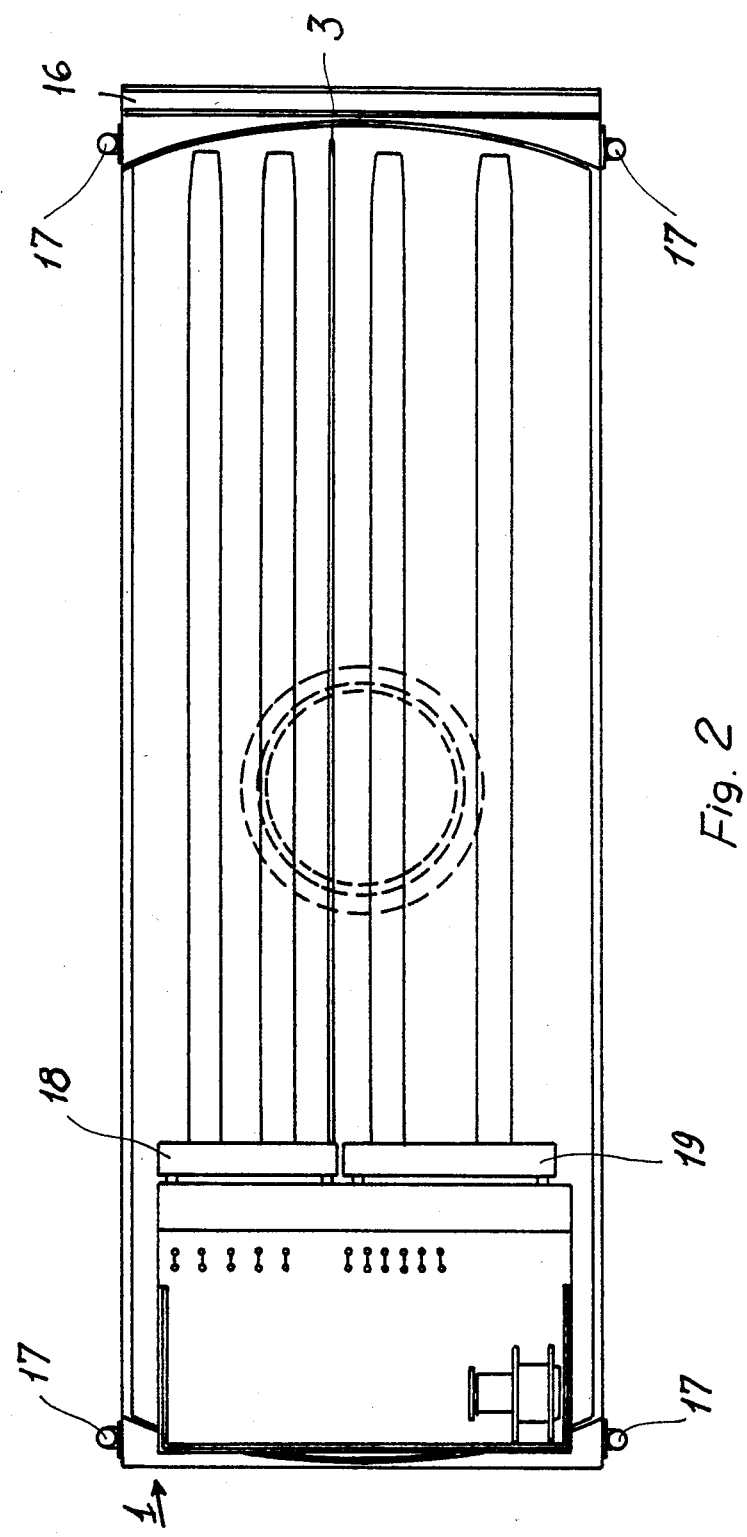
FIG. 2 illustrates that same pallet handling apparatus, by a top view, in its idle or rest condition.

With reference to the figures of the accompanying drawings, the pallet loading and unloading apparatus according to the present invention comprises a base frame 1, which is provided with four wheel sets, as driven by two hydraulic geared motors, indicated at 6.

The wheels 20 may slide along guides, consisting of rails 7, which are arranged between the palletized article store and the loading place of said palletized articles.

On the base frame 1 there is supported, with the interposition of a supporting member 15, a rotatable floor 2 effective to rotate with respect to the mentioned base frame 1 about a vertical axis which is located at a central position of said floor.

The latter is able of rotating in such a way as to form any suitable angle and it is driven by a geared motor 14, which latter is coupled to the mentioned supporting member 15 by means of a geared type of coupling.

More specifically the rotatable floor 2 is provided, on its upper or top face, preferably at the middle longitudinal line, with a guiding projection 3 which acts as a guiding element for a fork supporting sliding carriage, indicated at 4, which is provided with four driving wheels 11 effective to allow for said carriage 4 to freely move.

Thus the mentioned sliding carriage 4 will be able of displacing from one to the other end of the floor 2, as well as of directly raising, as it will become more apparent hereinafter, on the loading floor of the transportation vehicle or storing floor.

In particular the fork bearing carriage 4, provided with a control panel 9 thereon the operator acts, comprises a cable take up roller 5, effective to allow for the electric energizing cable to be taken up.

A carriage geared motor is moreover provided, which has been indicated at 9.

The carriage 4 is moreover provided, at the front whereof, with guides 10 for raising the forks 12, which, preferably are four in number and are provided at the bottom whereof with wheels 13, which, by means of a linkage operated by a hydraulic cylinder may change their position: in particular the wheels 13 support and are coupled to the forks by means of tie rods and linkages (not specifically shown) of any suitable known types, which linkages are such as to define a respective tiltable wheel supporting assembly for each pair of wheels 13. The tie rods, in turn, are operated by the same hydraulic assembly used for raising and lowering the forks, not specifically shown, and which may be of the "ATOS" type Series 100.

Thus, the mentioned pallets may be raised and lowered, after having been arranged on the forks, thereby facilitating the sliding movement of the fork set, both for engaging said pallets and for properly arranging them.

In other words the wheels 13 operate in such a way as to properly support the pallet load on the forks as the fork carriage 4 is displaced on a horizontal plane, with the pallets on the forks, thereby eliminating any bending stresses on the loaded forks.

To the fork carrying carriage 4 there are coupled two vertical sliding guides which form an integral part of said forks and consist of a fixed guide 19 and a movable guide 18, which are driven by a hydraulic cylinder, for taking up a given stroke, preferably of 400 mm in the case therein on a fork pair are loaded pallets having a side of 1200 mm and on the other fork pair are loaded pallets having a side of 800 mm, since the forks are provided with a different infraaxis effective to be varied depending on the pallet type to be used.

The mentioned carriage is moreover provided with a fork raising hydraulic assembly.

The base frame or chassis 1 is provided with four hydraulic cylinders 17, for raising said base frame, and with a tiltable levelling member 16, provided with a related hydraulic control.

That aspect is greatly inportant, since a number of transportation vehicles are provided with a not constant level loading floor.

Owing to that reason, the provision of the mentioned cylinders affords the operator with the possibility of bringing the floor 2 above the level of the transportation vehicle loading floor. Then, by lowering the tiltable member 16, and causing it to rest on the transportation vehicle loading floor, by means of known electric and hydraulic apparatus, the hydraulic fluid will be discharged from the cylinders 17, as far as the rotatable floor 2 will be brought flush with the transportation vehicle loading floor, thereby allowing foor the fork bearing carriage 4 to freely slide.

From the above disclosure it should be noted that the invention fully achieves the intended objects.

In particular it should be noted that a pallet handling or loading and unloading apparatus has been provided which is very reliable and affords the possibility of easily reducing the pallet handling time owing to the fact that it is possible to handle simultaneously a great number of pallets.

The invention, as disclosed, is susceptible to several modifications and variations all whereof fall within the spirit and scope of the invention itself.

Moreover all of the constructional details may be replaced by other equivalent elements.

I claim:

1. A pallet loading and unloading apparatus, comprising a base frame mounted on slidable wheels, said base supporting a loading floor rotatable about a substantial vertical axis thereon a fork bearing carriage is able of independently moving, said carriage supporting two different interaxis fork pairs the forks of which are provided, at the bottom, with variable position fork supporting sliding wheels, a supporting member interposed between said base frame and loading floor, hydraulic geared motors for operating said variable position fork supporting sliding wheels and said supporting member, said loading floor being provided, at the middle thereof, with a longitudinally extending guiding projection to be engaged with said fork bearing carriage, said fork bearing carriage including guides for raising said forks as well as a vertical fixed guide and a vertical movable guide for driving said forks depending on the size of the pallets loaded thereon.

2. A pallet loading and unloading apparatus according to claim 1 further comprising, associated with said base frame, four hydraulic cylinders so arranged and operated as to automatically bring said base frame to the same level as the pallet transportation vehicle loading floor, said hydraulic cylinders being controlled by known control means the operation of which depends on that of a tiltable member swingably coupled to said base frame and provided for resting on said pallet transportation vehicle loading floor.

* * * * *